Dec. 15, 1942.     D. O. SPROULE     2,304,965
WAVE FRONT INDICATORS
Filed Nov. 26, 1938     4 Sheets-Sheet 1
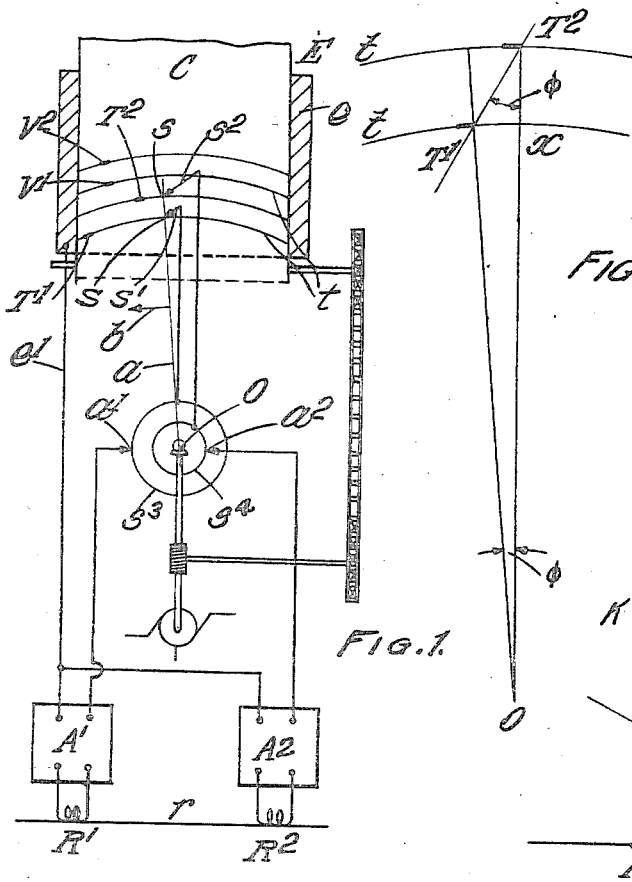
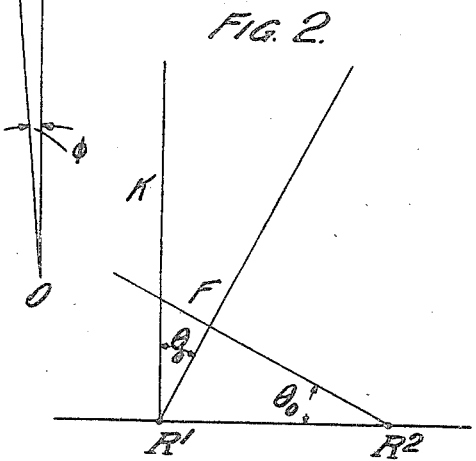
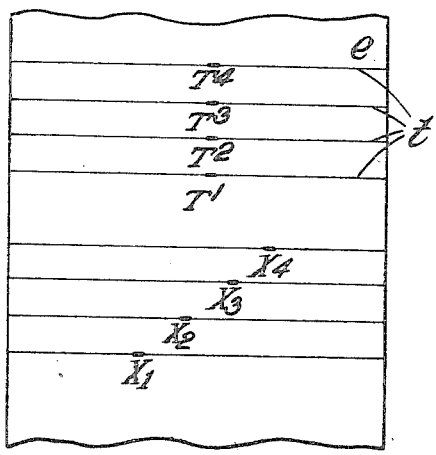
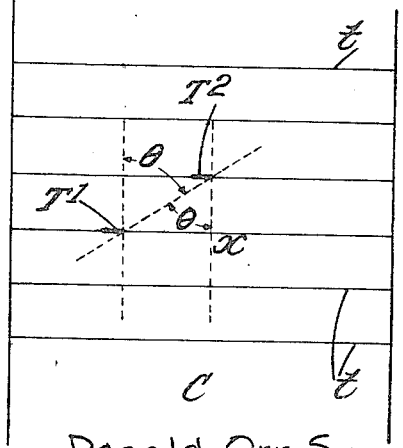
Donald Orr Sproule
INVENTOR
By [signature]
his ATT'y.

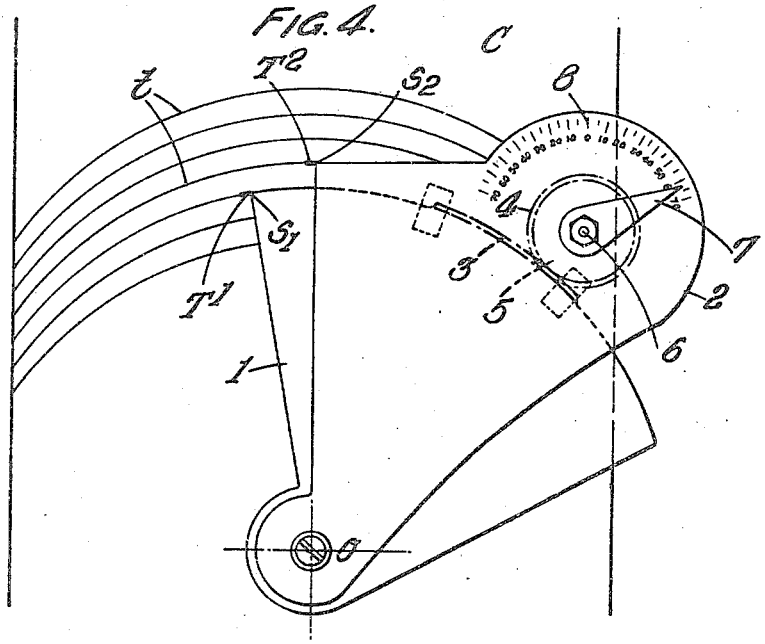
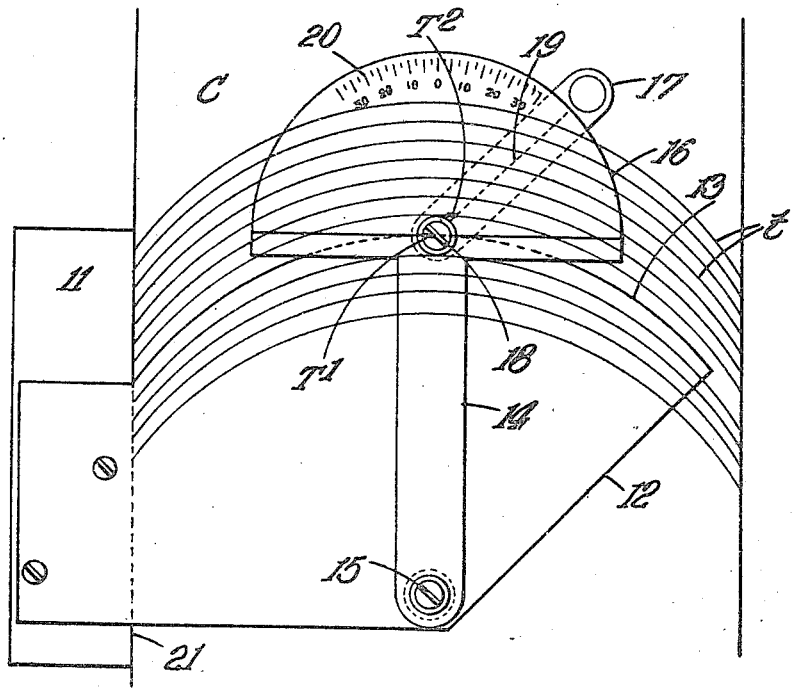

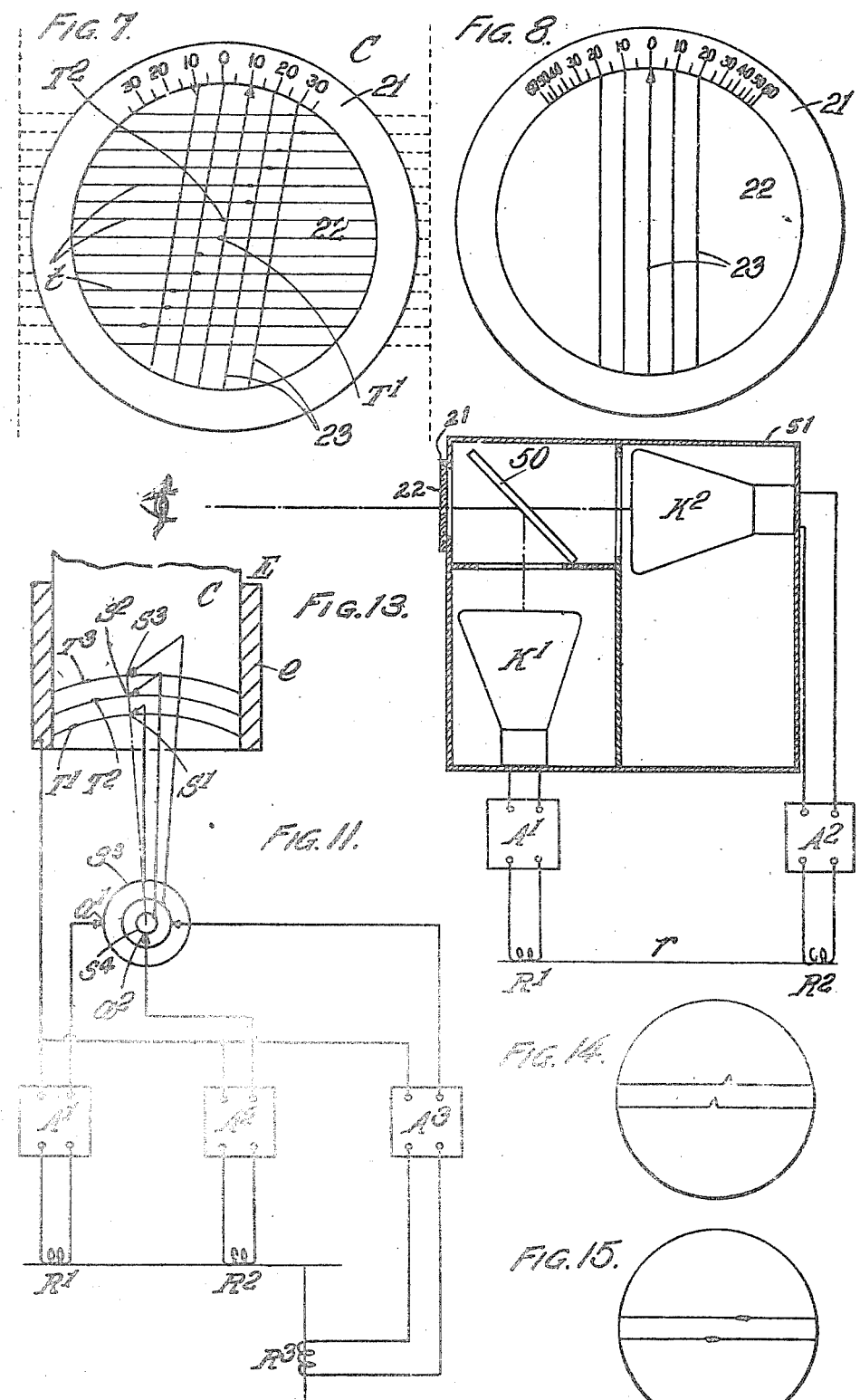

Dec. 15, 1942.   D. O. SPROULE   2,304,965
WAVE FRONT INDICATORS
Filed Nov. 26, 1938   4 Sheets-Sheet 4

Donald Orr Sproule
INVENTOR his ATT'Y

Patented Dec. 15, 1942

2,304,965

UNITED STATES PATENT OFFICE 2,304,965

WAVE FRONT INDICATOR

Donald Orr Sproule, London, England, assignor of one-third to Arthur Joseph Hughes, Essex, England, and one-third to Henry Hughes & Son Limited, London, England, a British limited-liability company Application November 26, 1938, Serial No. 242,641
In Great Britain November 26, 1937

5 Claims. (Cl. 177—352)

This invention relates to improvements in wave front indicators and has for its principal object to provide means whereby the direction of travel of a wave front can be determined more rapidly, with less disturbance from interference and with greater accuracy than has been possible hitherto inasmuch as it provides for a direct reading of the direction of travel of a compressional wave.

Another object of the invention is to provide means more responsive to sounds which are exceedingly variable in intensity and/or sounds of infrequent occurrence and/or sounds at random intervals of time, than known apparatus such for example as binaural directional systems or the directional hydrophone.

It is known that the direction of travel of a compressional wave may be determined by measuring the time interval between the arrival of the same wave pulse at different receivers, preferably disposed in line and various arrangements of oscillographs, and other time measuring devices have been employed for this purpose, but due to the necessity for interfering with the recording process in order to take readings, or for manual adjustment in order to secure a null position or a binaural "cross over" it has not been possible to take substantially continuous readings of direction without loss of time.

The invention also contemplates the constitution of an instrument which can be applied to the record at any moment in a simple, direct and effective manner without interfering with the production of the said record so that in practice a number of successive readings of direction can be taken so closely spaced on a time basis that in effect a continuous reading of direction is available.

The invention consists in a wave front indicator comprising two or more receivers, responsive to compressional waves and adapted to transform such waves into electrical pulses, arranged on a base line in definite relation with one another; two or more indicators, responsive to electrical pulses, electrically connected respectively to said receivers, and is characterised in that such indicators are located in corresponding relative positions as the receivers and that means are provided for comparing the positions of the indications to enable the angular relation of the wave front to the receiver base line to be directly ascertained from the angular relation of the indicated pulses without interrupting the operation of the indication producing elements.

It will be understood that the base line referred to above need not be straight nor regularly curved so that the receivers can be located in any arbitrarily selected positions; that any number of receivers, more than one, and associated indicators may be used within practical limits; and that the contrivances referred to as indicators may be cathode ray or other apparatus giving a visual result or an electrochemical or other recorder giving a graphic result.

In the drawings:

Figure 1 shows a schematic arrangement of the invention with two receivers;

Figure 2 is a diagram showing the relation of two receivers and the direction of travel of a wave;

Figure 3 is a diagram showing the geometrical analysis of the record produced by the arrangement of Figure 2;

Figure 4 is a front elevation of one form of chart reader suitable for use with this invention when the recorder has a continuously rotating arm with two styli thereon;

Figure 5 is a front elevation of another form of chart reader;

Figure 6 shows the form of chart or indication obtained when the paths are straight parallel lines and also shows the method of analysis;

Figure 7 is a front elevation of a simple form of chart reader suitable for use with the form of chart shown in Figure 6;

Figure 8 is a front elevation of a modified form of chart reader suitable for use with the form of chart shown in Figure 6;

Figure 11 shows a schematic arrangement of the invention with three receivers;

Figure 12 shows a chart when four receivers are used;

Figure 13 shows an arrangement in which cathode ray oscillographs are used;

Figures 14 and 15 show the different kinds of indications observed in the semi-reflecting mirror.

Figure 9:
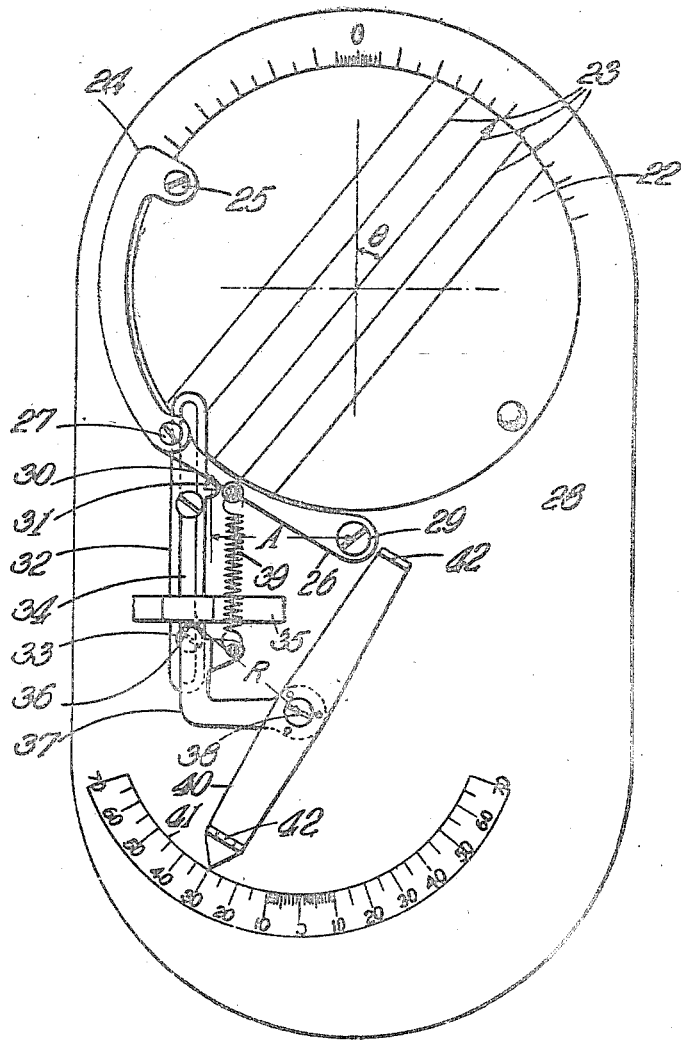
Figure 9 is a front elevation of another kind of chart reader.

In the following description the invention is explained by way of example only with reference to sound waves.

Figure 1 shows a very simple arrangement comprising two sound wave receivers $R^1$ and $R^2$, amplifiers $A^1$ and $A^2$ and an electrochemical recorder E having an arm rotating about an axis O and carrying two styli $S^1$ and $S^2$ following parallel paths $t$, $t$ and having the line $a$ joining the points S S of contact of the styli $S^1$ and $S^2$ on the chart C perpendicular to the direction of travel of said styli (indicated by the arrow b).

It will be understood that the electrical pulses, generated in the receivers $R^1$ and $R^2$ when a sound pulse is received, are conducted to the inputs of the thermionic amplifiers $A^1$ and $A^2$ respectively in the ordinary way and that the amplified electrical pulses are conducted from the outputs of said amplifiers to the slip rings $S^3$ and $S^4$, connected to the styli $S^1$ and $S^2$ respectively, by the brushes $a^1$ and $a^2$, a common return $e^1$ connecting the metal platen $e$ of the recorder E with both the amplifiers $A^1$ and $A^2$.

The receivers $R^1$ and $R^2$ are arranged relatively to one another and the recorder E so that when the said receivers are energized simultaneously by a sound wave, the records $V^1$ and $V^2$ of the indicated pulses by the styli $S^1$ and $S^2$ respectively fall on the line perpendicular to the direction of travel of said styli.

With such an arrangement it will be seen that when the base line $r$ of the receivers $R^1$ and $R^2$ is at an angle to the wave front, the said receivers will be energized consecutively and the separation of the records $T^1$ and $T^2$ of the individual pulses indicated by the styli $S^1$ and $S^2$ will be a function of the angle of the wave front to the base line $r$, whence the direction of travel of the wave can be determined in the following manner.

Referring to Figure 3, O represents the centre of rotation of the styli, $t\,t$ the concentric paths traced by said styli and $T^1\,T^2$ records of pulses indicated by the styli due to the arrivals of the same sound pulse consecutively at the receivers $R^1$ and $R^2$ of Figure 2.

In Figure 2 if the distance between $R^1$ and $R^2$ is $S$ and $\theta_0$ is the angle between the wave front and the base line $r$ then $$R^1F = S \sin \theta_0 = a \quad (I)$$

Further if $w$ is the angular velocity of the stylus arm and $c$ is the velocity of sound in the medium, then in Figure 3 the time taken to sweep out the angle $\phi$ is $$\frac{\phi}{w}$$

which is equal to the time taken by the sound in Figure 2 to travel the distance $R^1F$ so that $$\frac{\phi}{w} = \frac{a}{c} \quad (II)$$

From I $$\frac{\phi}{w} = \frac{S \sin \theta_0}{c} \quad (III)$$

for angles less than 25° $\sin \theta_0$ is sufficiently approximate to $\theta_0$ (radians) therefore $$\frac{\phi}{w} = \frac{S\theta_0}{c} \quad (IV)$$

and $$\theta_0 = \frac{\phi c}{Sw} \quad (V)$$

Thus it will be seen that $\theta_0$ can be deduced from readings of $\phi$ and simple arrangements enable this to be done easily; for example a protractor can be calibrated to indicate $\theta_0$ when applied to $\phi$ by the use of the factor $$\frac{c}{Sw}$$

If
$c = 4960$ feet per second
$S = 30$ feet
$w = 26$ radians per second $$\theta_0 = \frac{4960}{30 \times 26} \phi = 6.35 \phi \quad (VI)$$

and in such a case 6.35 would be the proper factor to use.

Alternatively the multiplication may be effected by means of a geared contrivance as shown in Figure 4 in which the parts 1 and 2 are of transparent material pivotally connected at o, the part 1 being provided with teeth 3 meshing with the teeth 4 of the pinion 5 rotatably mounted in the part 2. The arbor 6 of the pinion 5 has a pointer 7 which cooperates with the scale 8 on the part 2 and the velocity ratio of the gear 1 and pinion 5 is $$1 : \frac{c}{Sw}$$

The radius $os_1$ of the part 1 is equal to the radius $OS^1$ of operation of the stylus $S^1$ and the length $os_2$ is equal to the radius $OS^2$ of operation of the stylus $S^2$.

In use the chart reader shown in Figure 4 is so placed on a chart that the axis o occupies the position which was occupied by the axis of rotation of the stylus arm when the chart was made, the corner $s_1$ is placed on the leading edge of the mark made by the stylus $S^1$ and the corner $s_2$ is placed on the leading edge of the mark made by $S^2$; when this is done the angle between the edges $os_1$ and $os_2$ will be $\phi$ (Figure 3) and the pointer 7 will indicate the bearing $\theta_0$ (Figure 2) on the scale 8 with a precision depending on the approximation adopted in Equations IV and V.

Referring again to Figure 3 it will be seen that the length $T^1x$, when expressed in appropriate units is equal to the distance $FR^1$; that is to say $$K(T^1x) = S \sin \theta_0 = a \quad (VII)$$

From Equation I it is possible to make the length $T^2x$ (Figure 3) correspond to $S$ by employing the same units for $T^2x$ as for $T^1x$ so that $$K(T^2x) = S \quad (VIII)$$

By inspection of Figure 3

$$\tan \phi = \frac{T^1x}{T^2x} \quad (IX)$$

so that on dividing VII by VIII it is seen that $$\tan \phi = \sin \theta_0 \quad (X)$$

and for small angles $$\phi \text{ will be approximately } \theta_0 \quad (XI)$$

with less than 5° of error with readings of less than 30°.

From the above it will be seen that $\theta_0$ can be deduced from readings of $\phi$ and the instrument shown in Figure 5 enables this to be done without difficulty.

The instrument preferably of transparent material as shown in Figure 5 comprises a T-square element having a stock 11 and blade 12. The blade 12, has a circularly curved edge 13 and a limb 14 pivoted on said blade at the centre 15 of curvature of the edge 13. The limb 14 carries a protractor 16 and a link 17 pivoted at 18, the link 17 having an index line 19 for cooperation with the traces and the scale 20 of the protractor 16. To obtain the simplest results the distance between the inner edge 21 of the stock 11 and the centre 15 is such that when the edge 21 is applied to the edge of the chart C the centre 16 occupies the position of the axis of rotation of the stylus arm, the radius of curvature of the edge 13 is equal to the radius of the stylus $S^1$ from the centre O and the distance between the pivot centres 16 and 18 is equal to the radius of curvature of the edge 13.

In use this form of chart reader has the inner edge of the stock 11 placed against the edge of the chart C, the curved edge 13 is applied to the path $t$ of the stylus $S^1$, the limb 14 is moved about the centre 16 until the centre 18 lies over the leading edge of the trace $T^1$, the link 17 is moved about the centre 18 until the index line 19 falls across the leading edges of the traces $T^1$ and $T^2$ and the angle $\theta$ read off from the scale 20.

By this means the angle $\theta_0$ can be deduced within the limits of error in Equation XI; alternatively, if the scale of degrees is replaced by a calibration constructed according to Equation X, $\theta_0$ can be read off directly and accurately.

When the paths $t$ $t$ are straight lines such as occurs when the styli $S^1$ and $S^2$ are mounted on rectilinearly moved carriages or when the indications are observed by cathode ray tubes the indication on the chart will be as shown in Figure 6 and when associated with Figure 2 can be analysed in the following way.

If V is the linear velocity of the carriage then the time taken to travel the distance $T^1x$ (Figure 6) will be $$\frac{T^1x}{V}$$

which is equal to the time taken for sound to travel the distance $$FR_1 \text{ (Figure 2)} = \frac{\alpha}{c}$$

where c is the velocity of sound in the medium, and from Equations II and III $$\frac{\alpha}{c} = \frac{S \sin \theta}{c}$$

From Equation I $$\frac{\alpha}{c} = \frac{S \sin \theta_0}{c}$$

so that $$\frac{T^1x}{V} = \frac{\alpha}{c} = \frac{S \sin \theta_0}{c} \quad \text{(XII)}$$

If the separation of the styli $T^2x$ is chosen so that $$\frac{T^2x}{V} = \frac{S}{c} \quad \text{(XIII)}$$

it follows that $$\frac{T^1x}{T^2x} = \sin \theta_0 \quad \text{(XIV)}$$

if Equation XII is divided by Equation XIII.

On inspection of Figure 6 it is seen that $$\frac{T^1x}{T^2x} = \tan \theta \quad \text{(XV)}$$

so that $$\tan \theta = \sin \theta_0 \quad \text{XVI}$$

and for angles less than 30° it may be assumed that $$\theta \text{ approximates to } \theta_0 \quad \text{XVII}$$

within an error of less than 5°.

From Equation XVII it follows that the bearing angle can be read directly from the indication and in the case of a chart a device as shown in Figure 7 or 8 can be used with advantage.

In the arrangement shown in Figure 7 the rim 21 is mounted on the case of the recorder and a glass (or other transparent) disc 22 is mounted therein, said disc being ruled with parallel lines 23 at intervals. The rim 21 is graduated in degrees so that the bearing angle $\theta_0$ can be read off within the limits of accuracy of Equation XVII when the reading line is adjusted to cut across the leading edges of the traces $T^1$ $T^2$ on the paths $t$ $t$.

The arrangement shown in Figure 8 is similar to that shown in Figure 7 but the scale thereon is congested at its ends so as to indicate the bearing angle $\theta_0$ with the accuracy of Equation XVI.

Figure 10:
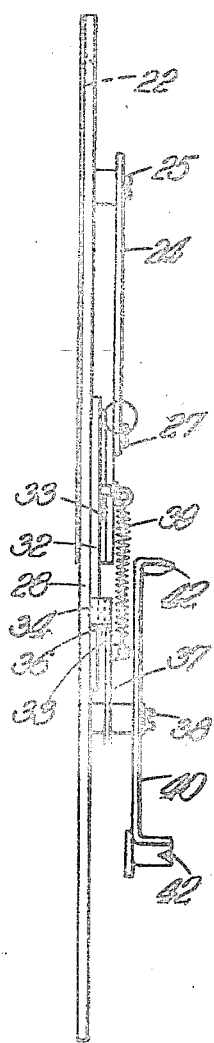
Figure 10 is a side elevation of Figure 9.

The chart reader shown in Figures 9 and 10 is arranged to give accurate bearings of rectilineal traces of sounds in degrees on a scale calibrated in actual degrees. For this purpose a simple mechanism is employed which automatically solves the trigonometrical relationships implicit in Equation XVI.

This simple mechanism comprises a rotatable transparent disc 22 having index lines 23 and rotatable about a point which is preferably near its centre. The disc 22 has an arm 24 pivoted on it at a point 25, said arm in turn being connected to a link 26 by the pivot 27. The link 26 is rotatably mounted on the base plate 28 by the pivot 29 and the distance between the pivot point 25 and the axis of rotation of the disc 22 is equal to the distance between the pivots 27 and 29.

The link 26 has a flat surface 30 contacting with a projection 31 mounted on a slotted bar 32 slidably arranged on pins 33 screwed into the base plate 28, the bar 32 having a cross piece 34 with a flat surface 35 perpendicular to the direction of sliding of the bar 32.

The flat surface 35 is engaged by the angular end 36 of a lever 37, mounted on a pivot 38, secured in the base plate 28, which is connected elastically to the link 26 by the spring 39 which serves to maintain the surface 30 in contact with the projection 31 and the surface 35 in contact with the angular end 36 thus transmitting any motion of the link 26 to the lever 37 without back lash or lost motion.

The lever 37 is rigidly connected to the arm 40 which cooperates with the scale 41 of degrees and is provided, if necessary, with sights 42, 42.

As a matter of convenience the chart reader shown in Figures 9 and 10 may be mounted on the recorder with the index lines 23 in appropriate relation to the traces produced by the styli and in use the disc 22 is rotated to apply one of the index lines 23 to the leading edges of traces resulting from a sound. This rotation through the angle $\theta$ displaces the link 26 angularly about the pivot 28 thus sliding the slotted bar 32 downwardly and rotating the arm 40 through an angle $\theta_0$ which can be read off from the scale 41 in degrees.

It will be seen that the rotation of the disc 22 through an angle $\theta$ produces a motion of the slotted bar 32 which is proportional to the tangent of the angle $\theta$ and that this motion is in turn transmitted to the lever 37 producing a rotation of that arm governed by the expression—displacement of the slotted bar 32 is equal to R sin $\theta_0$—where R is the radius of the angular end 36 about the pivot 38 and the change of angle $\theta$ relatively to the displacement of the slotted bar 32 is governed by the expression—the displacement of the slotted bar 32 is equal to A tan $\theta$—where A is the distance between the path of the contact edge of the projection 31 and the pivot 29. If A is made equal to R then $$\sin \theta_0 = \tan \theta$$

To determine on which side of the base line the sound source is located a third sound wave receiver $R^3$ may be located in a position at right angles to the base line $r$ of the two receivers $R^1$ and $R^2$ as shown in Figure 11, the receiver $R^3$ having an amplifier $A^3$ and a stylus $S^3$ so that there are three traces $T^1$ $T^2$ $T^3$ for each sound.

Further to reduce the possibility of a misleading result due to the simultaneous recordance of pulses due to the reception of several wave fronts, a number of receivers (say four or more) may be arranged on the same straight base line, and connected with the several styli respectively of an electro-chemical recorder also arranged on a straight line, and as it will be obvious that the receivers and styli must have a corresponding space relation, it is convenient to space the receivers and styli respectively at equal distances.

Such an arrangement will produce a record as shown in Figure 12 in which $T^1$ $T^2$ $T^3$ and $T^4$ on the paths $t\ t\ t\ t$ are traces indicating the arrival of a wave front simultaneously at four receivers and $X^1$ $X^2$ $X^3$ and $X^4$ are traces indicating the arrival of a wave front which is inclined to the straight base line of the receivers.

Instead of apparatus using pens or styli reciprocated or rotated continuously the reception of the electrical pulses from the amplifiers can be applied to cathode ray oscillographs.

As shown in Figure 13 the output from the amplifier $A^1$ excited by the receiver $R^1$ is applied to the deflecting plates of the tube $K^1$ and the output from the amplifier $A^2$ excited by the receiver $R^2$ is applied to the deflecting plates of the tube $K^2$ which has the same sweep velocity as the tube $K^1$, a disk 22 such as is shown in Fig. 7, 8 or 9 being supported on the casing 51 for the tubes $K^1$ and $K^2$ so that the indications on the two fluorescent screens and the markings on the disk 22 are brought into convenient relationship for observation by the semi-reflector 59 through which the indication of the tube $K^2$ is observed and which reflects the indication of the tube $K^1$.

The kind of indication obtained depends upon the mode of application of the pulse and may consist of a sideways deflection of the spot as shown in Figure 14 or a modulation of the intensity of the spot as shown in Figure 15.

For simplicity of description the chart readers illustrated in Figs. 4 and 5 are described as dissociated from the indicating instrument but in practice such readers are mounted on the case of such instrument either temporarily or permanently so that deductions can be made from indications immediately after recordance has been effected and it will be obvious that if a permanent mounting is provided the alignment of the reader can be effected in any possible way e. g. by a carriage on guide rails, by grooved guides or by a parallelogram mechanism.

I claim:

1. A wave front indicator comprising an element for receiving a visual indication, at least two means for producing visual indications on said element, means for actuating said two means to cause the potential points of indication to traverse said element at high, uniform and equal speed relatively thereto on parallel lines, a separate wave-responsive receiver connected to each of said two means for actuating them to produce visual indications on said element in the order of arrival of a wave front at said receivers and at intervals equal to the intervals between the arrival of said wave front at said receivers and a protractor disposed in the line of sight and overlying said element having means to be aligned with said visual indications and a pointer actuated by the last named means to indicate directly the angular relation of the wave front to a line extending through said receivers.

2. A wave front indicator comprising means for supporting a chart, means for advancing said chart slowly over said supporting means, a member movable at high and uniform speed relatively to and across said chart, at least two styli mounted in spaced relation on said member for traversing parallel paths transversely of said chart, a separate wave responsive device connected to each stylus for actuating the stylus to apply a mark to said chart, and protractor device overlying said chart and said member having means for alignment with the marks applied by said styli, a movable pointer actuated by the last named means and a dial adjacent to said pointer for indicating the angle of approach of said wave with relation to a line passing through said receivers.

3. A wave front indicator comprising a support for a chart, means for moving said chart over said support, a rotary arm having an end portion overlying said support, a plurality of styli on said end portion spaced apart radially of the axis of rotation of said arm, means for rotating said arm at an unvarying high speed as compared with the movement of said chart to cause said styli to traverse parallel arcuate paths across said chart, separate wave-responsive receivers connected to each of said styli to cause said styli to apply marks to said chart in their respective paths in the order and at intervals corresponding to the arrival of a wave front at said receivers, and a protractor disposed in the line of sight and overlying said support, having means to be aligned parallel to lines passing through said marks, and a pointer actuated by the last-named means to indicate directly the angular relationship of the wave front to a line passing through said receivers.

4. A wave front indicator comprising a plurality of electrical pulse generating receivers responsive to compressional waves, said receivers being spaced along a base line, an element adapted to receive visual indications, a plurality of devices electrically connected with said receivers, respectively, for producing visual indications on said indication receiving element when said receivers connected with said devices are excited, means for continuously displacing all of the potential points of indication on said element simultaneously along parallel lines and at a constant high speed relatively to said indication receiving element, and protractor means disposed in the line of sight of and overlying said element having means to be aligned parallel to lines passing through said indications, a pointer actuated by movement of said means to be aligned and a dial for indicating directly the angular relation of the wave front to said base line.

5. A wave front indicator, as claimed in claim 4, in which the parallel lines along which the potential points of indication are displaced, are concentric circular arcs.

D. O. SPROULE.